United States Patent [19]

Tissler et al.

[11] Patent Number: 5,133,952
[45] Date of Patent: Jul. 28, 1992

[54] METHOD FOR MODIFYING A ZEOLITE

[75] Inventors: Arno Tissler, Karlsruhe; Klaus K. Unger, Mainz; Hubertus Schmidt, Eitorf, all of Fed. Rep. of Germany

[73] Assignee: Vereinigte Aluminium-Werke Aktiengesellschaft, Bonn, Fed. Rep. of Germany

[21] Appl. No.: 603,245

[22] Filed: Oct. 22, 1990

Related U.S. Application Data

[63] Continuation of Ser. No. 318,819, Mar. 3, 1989, abandoned.

[30] Foreign Application Priority Data

Mar. 3, 1988 [DE] Fed. Rep. of Germany ....... 3806932

[51] Int. Cl.$^5$ ............................................. C01B 33/34
[52] U.S. Cl. ..................................... 423/328; 502/85; 502/86
[58] Field of Search ............... 403/118, 326, 328, 329, 403/330, 331, 332; 502/85, 86

[56] References Cited

U.S. PATENT DOCUMENTS

| | | | |
|---|---|---|---|
| 3,130,007 | 4/1964 | Breck | 423/328 |
| 3,374,182 | 3/1968 | Young | 423/328 |
| 3,671,191 | 6/1972 | Maher et al. | 423/328 |
| 3,852,411 | 12/1974 | Maness | 423/328 |
| 4,203,869 | 5/1980 | Rollmann | 423/328 |
| 4,248,847 | 2/1981 | Derleth et al. | 423/328 |
| 4,271,135 | 6/1981 | Wuesf et al. | 423/328 |
| 4,341,748 | 7/1982 | Plantz et al. | 423/328 |
| 4,435,526 | 3/1984 | Chang | 502/71 |
| 4,496,784 | 1/1985 | Moorehead | 585/486 |
| 4,564,719 | 1/1986 | Chang et al. | 585/640 |
| 4,670,620 | 6/1987 | Jacobs et al. | 585/640 |
| 4,687,654 | 8/1987 | Taramasso et al. | 423/328 |

FOREIGN PATENT DOCUMENTS 0087720 2/1983 European Pat. Off. .

*Primary Examiner*—R. Bruce Breneman
*Attorney, Agent, or Firm*—Darby & Darby

[57] ABSTRACT

Disclosed is a zeolite and a process for modifying a zeolite, which includes alkalizing the zeolite, and calcining the alkalized zeolite. The resultant modified zeolite has improved selectivity characteristics.

3 Claims, 1 Drawing Sheet

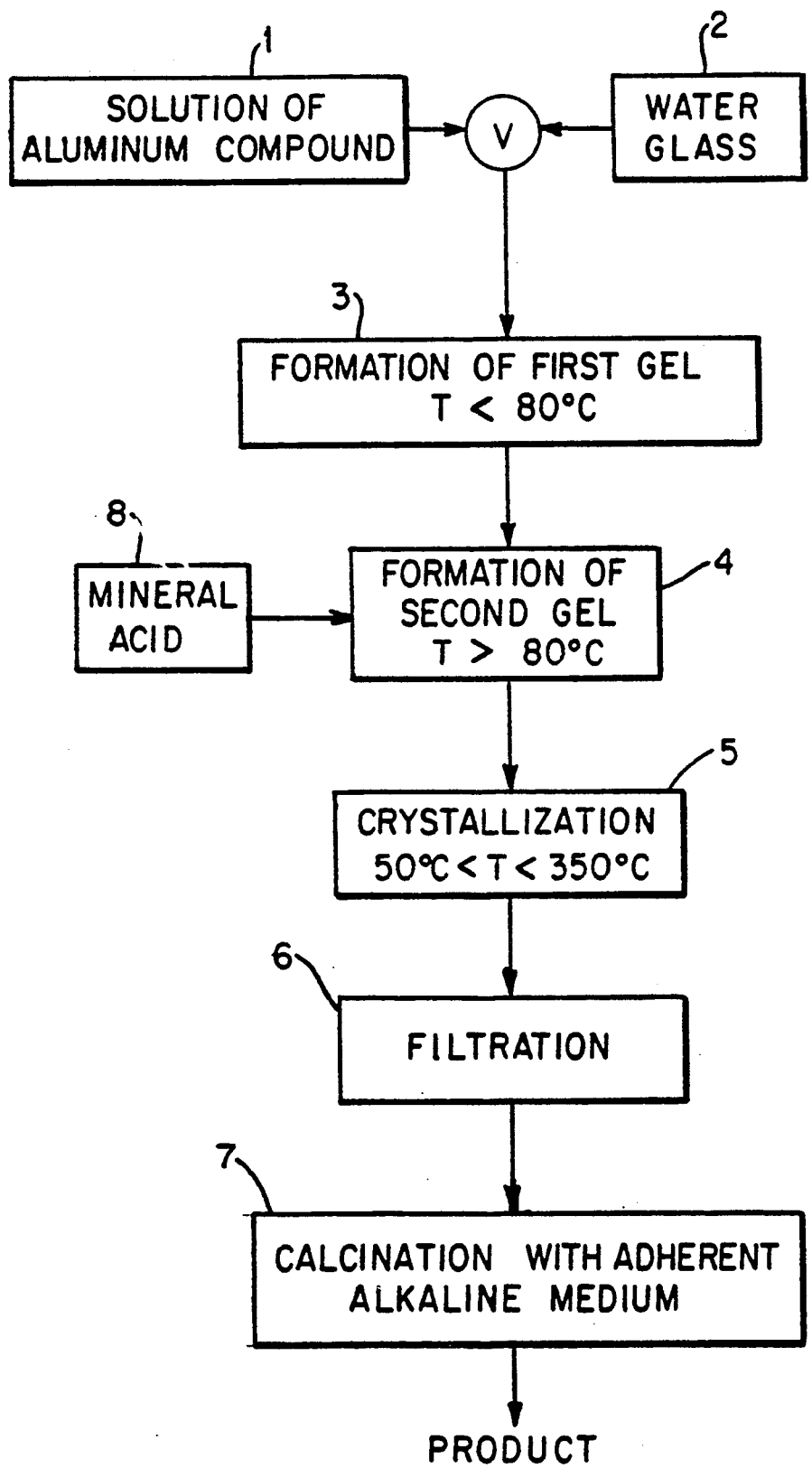

METHOD FOR MODIFYING A ZEOLITE

This is a continuation of prior application Ser. No. 318,819, filed Mar. 3, 1989, now abandoned.

FIELD OF THE INVENTION

The invention relates to a method for the modification of zeolites that are prepared by crystallization at elevated pressure and temperature, filtration, ion exchange, drying and, if necessary, activation by a thermal treatment.

BACKGROUND OF THE INVENTION

Modifications of different zeolite types are described in "Chemie in unserer Zeit" (Chemistry in Our Time), volume 20, 1986, No. 4, page 121. The objective of such modifications is to change the catalytic and adsorptive properties, as well as to increase the thermal, chemical and hydrothermal stability of the zeolite structure. For the improvement of "shape-selective" properties, very expensive methods frequently are required, such as the incorporation of phosphorus compounds into the zeolite lattice or the synthesis of metal complexes in the cavities of the zeolite framework. Shape-selectivity refers to the capacity of a catalyst to allow: (1) only one type or reactant molecule to pass through the pores of the catalyst to reach the catalytic sites (or sorption sites); and (2) only product molecules formed at the catalytic sites having predetermined dimensions, to diffuse out of the pores of the catalyst. Thus, shape-selective catalysts are useful in increasing the selectivity of a catalyst to a specific, desired product. Such catalysts are used in several important reactions, including for example: the conversion of methanol to gasoline; the conversion of methanol to olefins; the production of ethylbenzene from benzene and ethene; xylol isomerization processes; and several organic syntheses important in the preparation of organic intermediates.

From various investigations it is known for example that, for the disproportionation of ethylbenzene, the product selectivity (for paradiethylbenzene, based on the isomeric diethylbenzene formed), which represents a measure of the shape-selective properties of the zeolite catalyst, lies between 30 and 40% for a 2% conversion for ZSM-5 zeolite $$((Na,TPA)_3[(AlO_2)_3(SiO_2)_{93}]\cdot 16H_2O)$$

prepared with tetrapropylammonium (TPA) and between 40 and 80% for ZSM-5 that is prepared template-free according to the present invention, for crystallites of the same size and with comparable Si:Al ratios (Dissertation by U. Girrbach, University of Mainz, Germany 1987). The term "template-free" refers to the preparation of the ZSM-5 zeolite without TPA or other organic compounds.

OBJECT OF THE INVENTION

It is an object of the present invention to provide a simple and inexpensive process for improving the shape-selective properties and service life of different zeolite types. The process does not harm the environment and does not have a significant adverse effect on the activity of the respective zeolites.

SUMMARY OF THE INVENTION

The present invention is directed to a zeolite and a process for modifying a zeolite, which includes alkalizing the zeolite, and calcining the alkalized zeolite. The resultant modified zeolite has improved selectivity characteristics.

DETAILED DESCRIPTION OF THE INVENTION

The objective of the invention is accomplished by calcining the zeolite in the alkaline state. This calcining treatment significantly increases the shape-selective properties of the zeolite almost up to the 100% limit, based on the theoretical optimum selectivity.

While not wishing to be bound to theory, the present inventors believe that the alkaline calcination process causes selective removal of aluminum from the zeolite surface. This selective removal results in a reduction in the number of outer active sites. The outer active sites do not exhibit shape selectivity because neither the reactant nor product has to pass through a pore structure to reach a surface catalytic site. Thus, the relative number of inner sites (exhibiting shape selectivity) to outer sites (not exhibiting shape selectivity) is increased.

Pursuant to the present invention, a significant improvement in the service life of zeolite catalysts subjected to alkaline calcination is achieved.

As the term is used herein, the alkaline state is characterized by a pH greater than 7 and preferably of 11 to 13, which the zeolite has in an aqueous medium immediately before the calcining step. In this manner, the surface of the zeolite is subjected to an "alkaline reaction" even in the dry state resulting from calcining. As used herein, a zeolite subjected to these conditions is referred to as "alkalized".

The effect of the alkalized surface is independent of the way in which the zeolite was produced. Thus, zeolite catalysts prepared with templates and/or zeolites subjected to ion exchange as well as activation may be alkalized. This means that a zeolite can be subjected to the thermal treatment of the present invention directly after being synthesized without the requirement of an initial washing step. However, a zeolite that has been repeatedly washed may also be alkalized or converted into the alkaline state by treatment in a strongly alkaline solution. It is possible to alkalize the zeolite even after an ion exchange, when the surface of the zeolite has been neutralized by acids, or when an ion exchanged zeolite has already been subjected to a thermal activation.

The alkalized zeolite of the present invention, and the process of preparation according to the present invention, may be employed with all zeolite types. The process of the invention improves the shape-selective properties of the resultant alkalized zeolite.

A particularly advantageous area of application for the present invention is the special shape-selective zeolite types, such as the ZSM-5 zeolite. In this connection, it has been determined by the present inventors, to be particularly advantageous for improving the hydrothermal stability of ZSM-5, if the zeolite synthesis is carried out by a two step process of gel formation and subsequent crystallization.

The two step process includes mixing a solution which contains an aluminum compound, optionally including sodium sulfate, with a sodium water glass solution. The mixture is maintained at a temperature below 80° C. until a gel is formed (about 0.25 to 5 hours) which contains (100-x)% of the SiO2 required for zeolite formation (x may have a value between 30 and 90) and in which the $SiO_2:Al_2O_3$ ratio is between 20 and 150. In a second step, the gel formation is carried out at temperatures above 80° C., at atmospheric pressure, for a period of 0.1 to 3 hours with intensive stirring and with the addition of 10 to 60% mineral acid, until the complete formation of a sodium aluminum silicate gel has been attained.

The zeolite structure obtained by the two step process described above withstands a thermal treatment at temperatures above 1,000° C., the special shape-selective properties of the present invention being attained within a few minutes.

In principle, the thermal treatment according to the present invention, is initiated at temperatures above 200° C. At these temperatures, however, treatment times of several days are required to achieve any detectable effect on the shape selectivity of the zeolite. At high temperatures of more than 1,000° C., such as those which can be produced in a fluidized bed even by brief treatments for fractions of a minute, the alkalized zeolite can be finished at least at the surface, so that it has appreciable improvements in its shape-selective properties and in its service life behavior. Preferably, however, temperatures ranging from 500° C. to 650° C. are maintained in a conventional furnace for 6 to 12 hours, this time corresponding to the actual treatment time without heating and cooling phases.

The invention is described in greater detail in the following examples. An outline of the course of the inventive process for the preparation of ZSM-5 is shown in FIG. 1. In Table 1, the shape-selective properties of zeolites prepared in different ways are compared.

A schematic outline of the process of the present invention is set forth in FIG. 1. A solution 1 of an aluminum compound, optionally including sodium sulfate, is mixed with a solution of water glass 2. A two step gel-forming process takes place at 3 and 4. The gel formation commences at 3 at a temperature below 80° C., which is maintained for 0.25 to 5 hours, and subsequently continues in the second gel step 4 at temperatures above 80° C. with the addition of 10 to 60% mineral acid 8 until the formation of a sodium aluminum silicate gel is complete. The crystallization 5 is carried out in an autoclave at a predetermined temperature of between 50 and 350° C. and under autogenous pressure, at a pH of between about 10-13 and in a static, stirred or tube reactor, until the formation of product is complete. After filtration 6, the zeolite obtained pursuant to the invention can be subjected, without washing, and in the alkaline state to a calcining step 7, preferably at temperatures between 500° C. and 650° C. for 6 to 12 hours.

Four zeolites A, B, C and D of the ZSM-5 type were prepared according to the present invention, pursuant to the process set forth above, by varying the relative amounts of $Al_2(SO_4)_3 \times 18H_2O$ and $H_2SO_4$. The composition of these zeolites is described in Table 1.

TABLE 1

|  | A | B | C | D |
|---|---|---|---|---|
| Water glass solution | 65 kg | 65 kg | 65 kg | 65 kg |
| $Al_2(SO_4)_3 \times 18H_2O$ | 7.61 kg | 4.87 kg | 3.58 kg | 2.48 kg |
| $H_2SO_4$ (98%) | 2.77 kg | 4.06 kg | 4.63 kg | 5.14 kg |
| $Na_2SO_4$ | 1.06 kg | 1.06 kg | 1.06 kg | 1.06 kg |
| $H_2O$ | 180 kg | 180 kg | 180 kg | 180 kg |

In Table 1 the water glass solution consisted of 8.13% $Na_2O$, 28.58% $SiO_2$ and 0.037% $Al_2O_3$, balance water. The crystallization took place at a temperature of 185° C. under autogenous pressure in an autoclave.

After filtration, the zeolites A, B, C, D that were obtained, were each divided into two portions A, A'; B, B'; C, C'; and D, D'. Without being washed the A, B, C, D portions, were subjected to calcining at 500° C. for 6 hours according to the process of the present invention. The A', B', C', D zeolite portions served as controls. These samples were not subjected to any thermal treatment. After being washed 5 times with water, they were dried and experimental amounts were then investigated for their catalytic properties (activity, shape selectivity) using the disproportionation of diethylbenzene as a comparative standard.

The catalytic test reactions were carried out at a temperature of 250° C. and at a reactor velocity of 0.3 $h^{-1}$ (WHSV). The partial pressure of ethylbenzene was 7.24 mbar. The reactor selectivity was measured at a conversion of 2%. The results are shown in tabular form in Table 2.

The first horizontal row of Table 2 indicates the ratio of $SiO_2:Al_2O_3$. The ratio was calculated by chemical analysis (ICP). The second horizontal row in Table 2 shows the selectivity of the zeolite, expressed as a percentage of optimum selectivity (i.e., 100% selectivity for paradiethylbenzene). The degree of conversion was 2% and the reaction temperature 523° K. at normal pressure.

The activity of the thermally treated zeolite samples A, B, C and D was between 0 and 15% below the activity of the comparison control samples A', B', C' and D'. However, as can be seen from the Table, the degree of selectivity of the experimental zeolites (A, B, C and D) was substantially higher than the selectivity obtained using the control zeolites (A', B', C' and D').

TABLE 2

|  | A | B | C | D | A' | B' | C' | D' |
|---|---|---|---|---|---|---|---|---|
| $SiO_2/Al_2O_3$ | 26.5 | 41 | 55 | 78 | 40 | 41 | 55 | 78 |
| Selectivity | 55 | 94 | 94 | >94 | 36 | 38 | 58 | 67 |

What is claimed is:

1. A process for modifying a zeolite, which comprises:
treating the zeolite with an aqueous medium having a pH greater than 10;
removing a portion of said medium from the surface of said zeolite leaving residual adherent medium on said zeolite; and
calcining said zeolite which contains adherent aqueous medium having a pH greater than 10 at a temperature between about 500° C. and about 650° C. for between about 6 and about 12 hours.

2. A process for modifying a zeolite which comprises:
treating said zeolite with an alkaline aqueous medium having a pH between about pH 10 and about pH 13;
filtering said zeolite to remove the excess of said alkaline medium from the surface of said zeolite but to leave a portion of said alkaline medium adherent to said zeolite; and
calcining said zeolite which contains said adherent medium at a temperature between about 500° C and about 650° C. for between about 6 and about 12 hours.

3. A method for making a zeolite which comprises:
mixing a solution containing an aluminum compound and a water glass solution in amounts effective for the formation of zeolites with a $SiO_2:Al_2O_3$ ratio between 20 and 150;

heating said mixed solution at a temperature below 80° C. for between about 0.25 and about 5 hours to form a first gel;

heating said first gel to a temperature greater than 80° C. and adding a mineral acid to said first gel while stirring said first gel for between about 0.1 and 3 hours to form a second gel, said added mineral acid being between about 10 and 60% by weight of said first gel;

autoclaving said second gel at a temperature of between about 50° C. and 350° C. to form a crystallized gel;

filtering said crystallized gel to obtain a pentasil zeolite;

treating said zeolite with an aqueous medium having a pH greater than 10;

filtering said zeolite to remove excess aqueous medium but to leave alkaline aqueous medium adhering to said zeolite; and calcining said zeolite which contains said adherent medium at a temperature between about 500° C. and about 650° C. for between about 6 and about 12 hours.

* * * * *